(12) United States Patent
Rampal et al.

(10) Patent No.: US 6,280,141 B1
(45) Date of Patent: *Aug. 28, 2001

(54) SWASH-PLATES SYSTEM FOR CONTROL OF THE PITCH OF ROTOR BLADES WITH ROTATING PLATE DRIVER

(75) Inventors: Etienne Jean Rampal, Marseilles; Sylvie Garcin, Carry-le-Rouet, both of (FR)

(73) Assignee: Eurocopter (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/157,817

(22) Filed: Sep. 21, 1998

(30) Foreign Application Priority Data

Sep. 30, 1997 (FR) .................................................. 97 12126

(51) Int. Cl.⁷ .................................................. B64C 27/605
(52) U.S. Cl. ...................... 416/114; 416/134 A; 416/141; 416/170 R
(58) Field of Search .................................. 416/114, 115, 416/134 A, 141, 170 R

(56) References Cited

U.S. PATENT DOCUMENTS

| 3,486,832 | * | 12/1969 | Stone et al. | 416/114 |
| 3,734,644 | * | 5/1973 | Garcia | 416/114 |
| 4,375,940 | * | 3/1983 | Lovera et al. | 416/114 |
| 4,630,998 | * | 12/1986 | Leman et al. | 416/114 |
| 5,135,356 | | 8/1992 | Shepherd | 416/114 |
| 5,199,849 | * | 4/1993 | Leman | 416/114 |
| 6,033,182 | * | 3/2000 | Rampal | 416/114 |

FOREIGN PATENT DOCUMENTS

| 36 03 400 | 5/1987 | (DE) . |
| 36 20 794 | 12/1987 | (DE) . |

* cited by examiner

Primary Examiner—Edward K. Look
Assistant Examiner—Richard Woo
(74) Attorney, Agent, or Firm—Piper Marbury Rudnick & Wolfe

(57) ABSTRACT

The rotating plate of the system is fixed in rotation with the rotor by a driver with two rigid driving tracks extending axially and diametrically opposite in being fixed in rotation with the rotor. Each track engages with one of two driving fingers fixed in rotation with the rotating plate and diametrically opposite on this latter. Each track has two webs between which one finger is engaged with the result of following on this track a rectilinear trajectory, parallel to the rotor axis and a circular arc trajectory centerd on this axis, respectively in the case of change of collective and cyclic pitch.

22 Claims, 8 Drawing Sheets

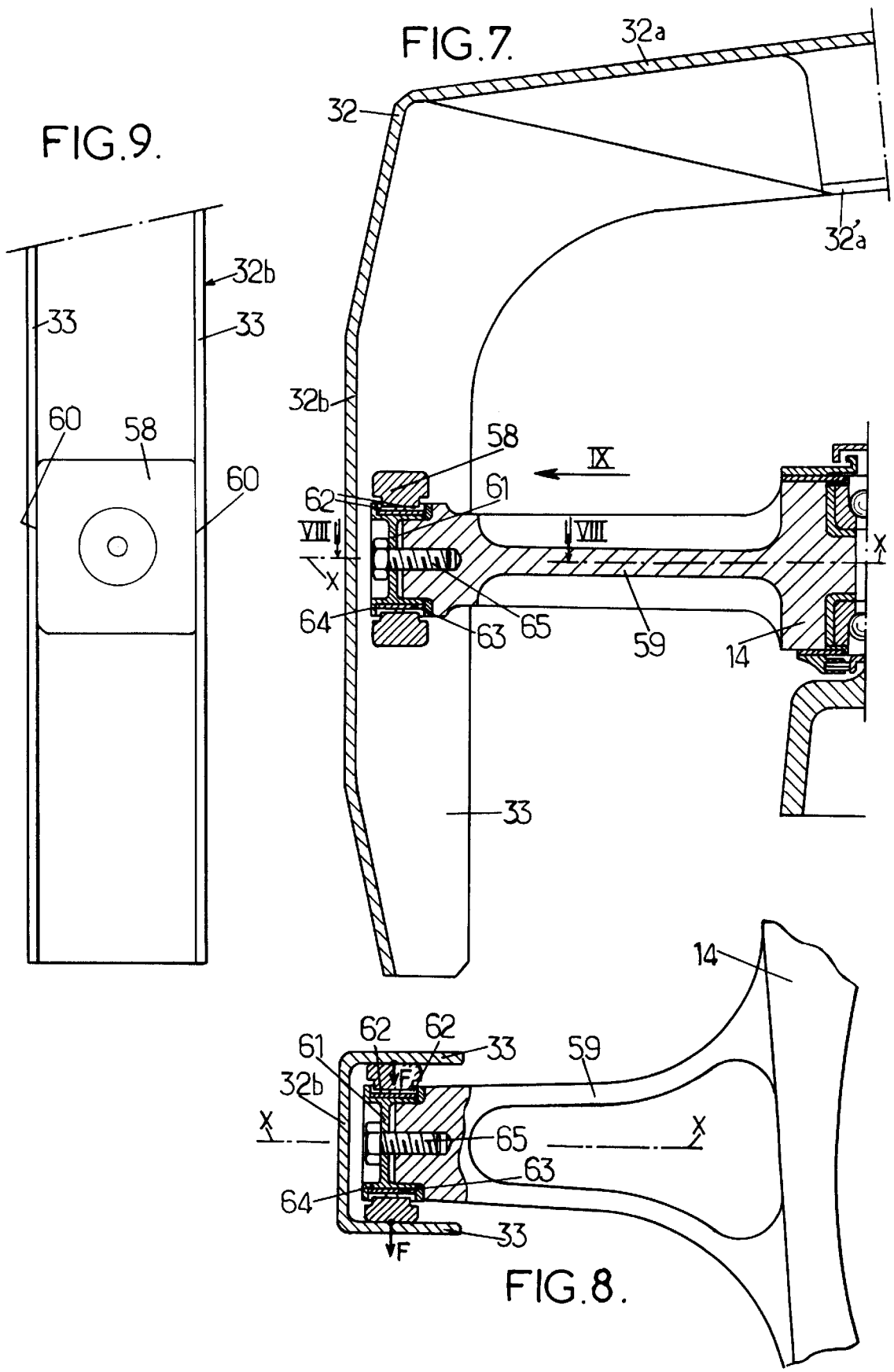

Figure 1:
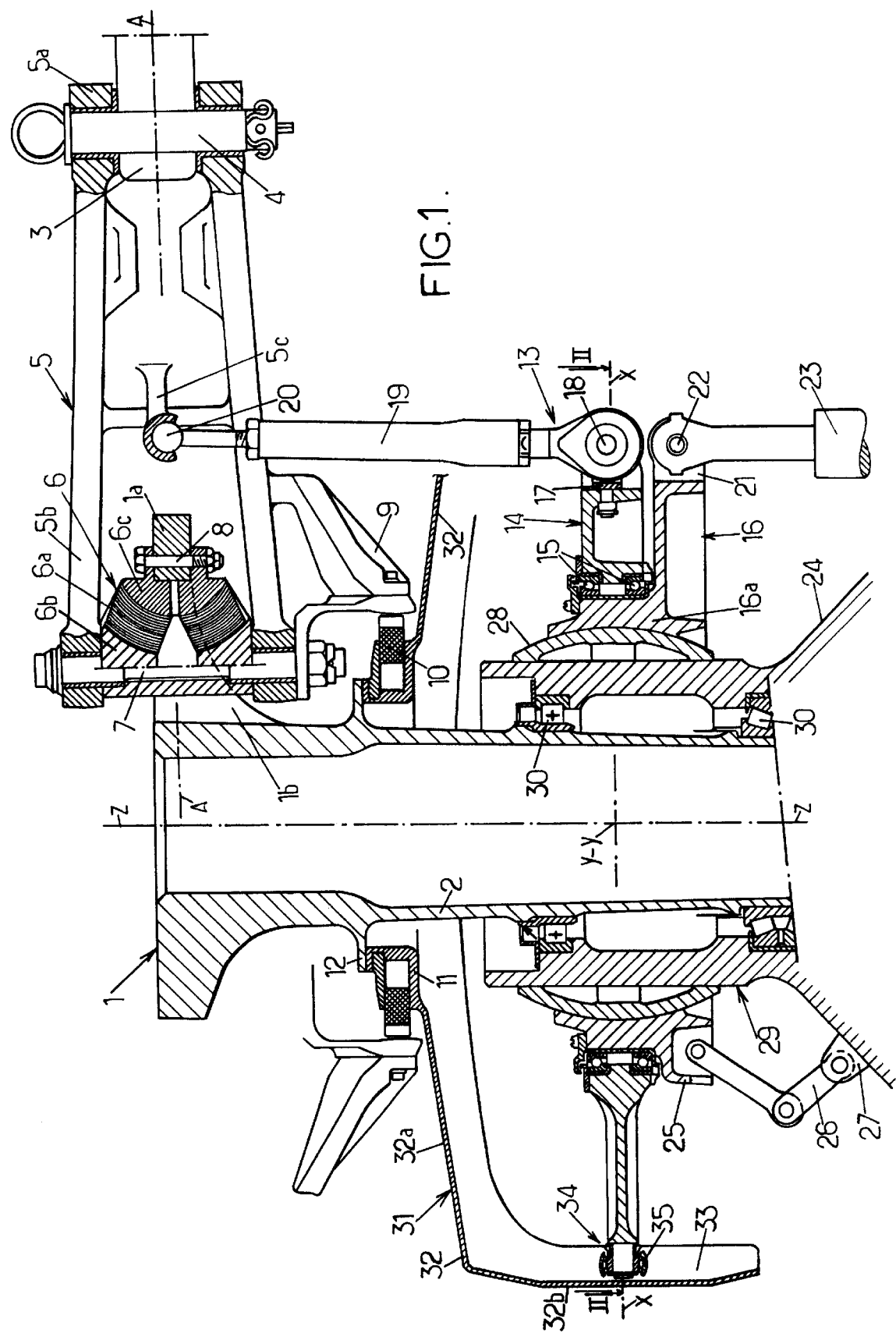

SWASH-PLATES SYSTEM FOR CONTROL OF THE PITCH OF ROTOR BLADES WITH ROTATING PLATE DRIVER

The invention concerns control systems for the pitch of the blades of a gyroplane, in particular a helicopter main rotor, the rotor being of the type for which each blade is, on the one hand, rotated about a rotational axis of a rotor shaft, or rotor axis, by means of a hub fixed to rotate with the shaft, and, on the other hand, fixed to rotate, around a longitudinal change of pitch axis of the blade, with at least a pitch lever controlled by a corresponding pitch rod.

The invention relates more precisely to a pitch control system of the type including an assembly of swash-plates, and such that each pitch rod is connected to a plate rotating with the rotor and belonging to the swash-plates assembly, in which the rotating plate is mounted to rotate on a non-rotating plate, held by at least a non-rotating connecting part connecting the non-rotating plate with the gyroplane structure, the two plates being annular, surrounding the rotor axis and being able to be axially translated, that is to say parallel to the rotor axis, and inclined in every direction around the rotor axis, under the action of control actuators connecting the non-rotating plate to the structure, in order to control respectively the collective pitch and the cyclic pitch of the blades.

Generally, the two plates surround the rotor shaft and the control actuators are three servo controlled jacks or similar actuators placed between the cylindrical plates and the gyroplane structure, and articulated by ball joints at their lower and upper ends respectively on this structure and in devises of the non-rotating plate, whereas the pitch rods extend between the swash-plates and the pitch levers of the rotor blades, and are articulated by ball joints at their upper and lower ends respectively on the pitch levers and in devises distributed along the periphery of the rotating plate.

Most often, the swash-plates are translatable axially and able to be inclined by an axial translation and tipping guiding assembly which includes a central ball joint, centred on the rotor axis, and on which the non-rotating plate, and therefore the swash-plates, are mounted to oscillate, the ball joint being itself mounted axially sliding (parallel to the rotor axis) around a cylindrical guide coaxial with the rotor axis and non-rotating around this rotor axis, and generally fixed in relation to the gyroplane structure. When the swash-plates surround the rotor shaft, which is most often the case, the cylindrical guide is tubular, surrounds the rotor shaft, and is fixed to a casing secured to the gyroplane structure and surrounding the connection of the base of the rotor shaft to the main gear box.

Also most often, one or several of the upper and rotating connecting part(s), or lower and non-rotating connecting part(s) which connect respectively the rotor to the rotating plate in order to rotate this latter, and the structure to the non-rotating plate, in order to hold this latter, is or are one or both of compasses with two arms articulated as scissors and connected together by a pivot or a hinge, which enables the two arms of each compass to separate or approach one another in order to enable the displacements in the direction of the rotor axis, since the upper and lower arms of a rotating compass are moreover articulated respectively on the shaft or the rotor hub and on the rotating plate, and that the lower and upper arms of a non-rotating compass are moreover articulated on the gyroplane structure and on the non-rotating plate.

These rotating and non-rotating compasses have the disadvantage that their articulations comprise traditional bearings, little reliable, or, on the most recent helicopters, ball joints and self-lubricating bearings including numerous shafts and carbide rings, which are heavy and expensive.

Moreover, a certain height or axial (parallel to the rotor axis) size and width is necessary for efficient operation of the compasses. Now, in order to facilitate their loading, for example in the hold of a transport aircraft, and to improve their capability of being housed in the hangar, for example of a ship, modern helicopters must have a vertical or axial compactness as good as possible for the shaft and the main rotor assembly and the swash-plates assembly which surround it. But the reduction of height or axial dimension of such an assembly is limited by interferences between the two arms of a compass in the closing of this latter as well as by the maximum ball joint angles permitted by construction of the compasses' articulation ball joints.

The axial size of a swash-plates control system with compasses being principally determined by the clearances of the compasses, because of the closing and ball jointing angles necessary for their operation, it has already been proposed, in order to reduce the height of such an assembly, to remove either the rotating compass or compasses, or the non-rotating compass or compasses, and to use two guide columns, parallel to each other and to the rotor axis on either side of this axis in a same radial plane passing through the rotor axis, of an axial translation and tipping guide system of the cylindrical plates which includes also a universal connecting joint, with an intermediate ring sliding axially with the aid of the columns, and articulated by pivoting on these columns around a diametral axis of the ring, which is an axis remaining perpendicular to the rotor axis, whereas the ring is articulated by pivoting on one of the swash-plates around another diametral axis of the ring, which is perpendicular to the first diametral axis, as proposed by DE-A-36 03 -400 and DE-A-36 20 794. In this way, the axial displacements of the swash-plates and the ring are guided by the two columns, whereas the tipping of the swash-plates in every direction around the rotor axis is obtained by pivoting the swash-plates relative to the ring about one of the two diametral and perpendicular axes of the ring, and by pivoting the ring on the columns about the other of these two perpendicular diametral axes.

The guide columns can be rotating (rotating with the rotor), and therefore consequently the ring installed in this case between the rotating columns, on the one hand, and, on the other hand, the rotating plate in this way rotated by the columns and the ring which replace one or both rotating compasses. But the guide columns can also be non-rotating, that is to say held against all rotation around the rotor axis by a support fixed to the gyroplane structure, in which case the ring is also non-rotating and installed between, on the one hand, the non-rotating columns, and, on the other hand, the non-rotating plate, thus held in rotation by the non-rotating columns and the non-rotating ring, which replace one or both non-rotating compasses.

If the column systems have the advantage of giving a gain in (axial) height compared with the compass systems, the fact remains that the column systems have the inconveniences of a greater transverse size, as a result of a greater diameter of the swash-plates assembly in order to house the intermediate ring between the swash-plates and the columns, as well as a low resistance and a bad handling of the vibrations, which leads to avoiding the use of rotating columns. Finally, the use of rotating or non-rotating guide columns does not prevent the simultaneous use of one or more compasses respectively non-rotating or rotating, because it is to exclude a system comprising at the same time non-rotating columns and rotating columns insofar as it does not enable all the tipping demanded by the cyclic pitch controls and assured by the universal joint ring.

The problem at the base of the invention is to propose a swash-plates pitch control system which does not comprise a rotating compass for rotating the rotating plate, and which comprises instead means which enable the reduction of the axial size of the pitch control system, and therefore the mast-hub assembly of a main rotor.

Another aim of the invention is to propose a pitch control system in which one or both rotating compasses of the conventional systems is or are replaced by means for driving the rotating plate which is more suitable for the various practical demands, and which particularly comprises fewer parts, which are less heavy, less expensive to manufacture, to install and to maintain, and which generate a lower aerodynamic drag than the rotating compasses.

It is clear that the means of the invention, replacing the rotating compasses, must be able to be used in a pitch control system with a central ball joint sliding axially around a cylindrical guide or in a system with non-rotating guide columns and non-rotating universal joint ring.

To this end, the pitch control system of the invention, of the type presented above, is characterised in that, the rotating plate is fixed in rotation with the rotor by a rotating plate driver, which includes two rigid rotating tracks, extending at least in part substantially axially, parallel to the rotor axis, diametrically opposite in relation to the rotor axis and fixed in rotation with one at least of the two parts which are the hub and the rotor shaft, each track engaging with respectively one of two driving fingers rotating with the rotating plate and diametrically opposite on this latter, in relation to the rotor axis, one of the two engaging elements which are a track and a finger, having two webs between which the other element is engaged, with the result that each driving finger follows, on the corresponding track, a rectilinear trajectory, parallel to the rotor axis, in the case of collective pitch variation, and a circular arc trajectory centred on the rotor axis, in the case of cyclic pitch variation.

In the system of the invention, the rotating compasses are replaced by a driver with two rigid tracks, which does not bend and is not articulated, and is capable of rotating the rotating plate by its engagement with the two fingers of this latter. Simultaneously, the number of parts of the system is reduced, as well as their weight, from which results a simplification of the installation and maintenance, and therefore a decrease in production, installation and maintenance costs, relative to a rotating compass version.

In accordance with an advantageously simple and rigid version, each driving track is delimited in a substantially axial groove in the driver, and the corresponding finger is engaged in the groove. For a better fatigue strength and a better flexural and torsional rigidity, it is more advantageous for each groove to be formed in a substantially axial part of respectively one of two rigid driving arms, said part having a transverse "U" section, and that the corresponding finger is engaged between the two webs of the "U" groove of the said arm.

In order to limit the transverse size of the swash-plates, and therefore the drag, retaining the aforementioned advantages, it is more advantageous that the "U" groove is open radially toward the rotor axis, and that each finger projects outwards from the rotating plate, radially in relation to the centre of this rotating plate.

In an advantageous rigid and simple version of the connection of the driver to the rotor, each driver arm comprises advantageously a substantially radial arm part in relation to the rotor axis, and connecting its substantially axial arm part to a central part for connection to a fixing flange on the rotor shaft, from the side turned toward the hub in relation to the swash-plates.

In order to take into account that the rotation driving forces can be dissymmetrical and alternate on the two webs of the arm "U" groove, particularly during changes of the collective and cyclic pitch, one at least of the fingers, and preferably each of them, includes advantageously at least a runner and/or at least a roller respectively sliding and/or rolling against one at least of the two webs of the "U" groove delimiting the corresponding driving track.

When each finger is a runner, this runner and the corresponding driving track comprise advantageously carbide coatings, at least in the mutual contact zones, in order to enable load transfers with reduced friction.

To this end, the runner is advantageously articulated in relation to the rotating plate, and, in a preferred version form, the runner has two lateral opposite faces substantially plane and parallel to the "U" groove webs in which the runner slides, and the runner is rotary and sliding mounted around a runner fastening hub which is fixed on the external radial end of a finger carrier arm of the rotating plate.

In another version, the fingers can each comprise respectively one of two coaxial rollers, mounted diametrically opposite on the rotating plate and rolling around their common axis, which is a diametral axis of the rotating plate.

As a variation, one at least of the fingers, but preferably each of them for dynamic equilibrium of the system, comprise two double rollers, each mounted to rotate around respectively one of two axes substantially parallel to a same substantially radial axis of the rotating plate, and each held by elastic return means in rolling contact against respectively one of the two webs of the corresponding "U" groove.

In this variation, each of the double rollers can be rotary mounted, by at least a bearing, on respectively one of two supports which are movable, substantially perpendicularly to the said substantially radial axis, and separated from each other by the said elastic return means, at the external radial end of a finger carrier arm of the rotating plate.

In accordance with another variation, one at least of the fingers, and preferably each of them, can comprise a roller and a runner, the roller being mounted to rotate around a substantially radial axis of the rotating plate, and the roller and the runner being held by elastic return means in respectively rolling and sliding contact against respectively one of the two webs of the corresponding "U" groove.

In this second variation, by analogy with the first, the runner and the roller are respectively rotary mounted on respectively one of two supports which are movable, substantially perpendicularly to the said substantially radial axis, and separated from each other by the elastic return means, at the external radial end of a finger carrier arm of the rotating plate.

When the fingers each comprise at least a roller, it is advantageous, in order to remove all risk of the roller sliding during the collective pitch change, that one at least of the rollers is a ball joint roller rotary mounted, around a substantially radial axis on the rotating plate, and pivoting around every axis perpendicular to the said substantially radial axis, on a fastening hub of the said roller which is fixed on the external radial end of a finger carrier arm of the rotating plate.

Advantageously, the pivoting of the roller ball joint around an axis perpendicular to the said substantially radial axis is limited by a rotating ring, rotary mounted around the said substantially radial axis on the roller fastening hub, the rotating ring removing also all risk of radial friction.

In order to avoid all interference between a pitch rod and the driver, during a pitch variation of the corresponding blade, it is advantageous that the finger carrier arm is brought back to project laterally on a side of a rotating plate clevis in which a pitch rod is articulated.

In a system in accordance with the invention, the rotating plate driver is combined with a non-rotating connection part connecting the non-rotating plate to the gyroplane structure, and the structure of this non-rotating connection part depends mainly on the structure of the connection between the swash-plates and the gyroplane rotor shaft.

The swash-plates can be translated and inclined by an axial translation and tipping guide mechanism which includes a central ball joint, centred on the rotor axis and on which ball joint the swash-plates are oscillating mounted, the said ball joint being sliding mounted parallel to the rotor axis around a cylindrical guide coaxial with the rotor axis and non-rotating around the said rotor axis, and preferably fixed in relation to the gyroplane structure, in which case the non-rotating connection part can be a non-rotating compass.

But it is also possible that the swash-plates can be translated and inclined by an axial translation and tipping guide mechanism which includes a universal joint connection, with a non-rotating ring around the rotor axis, and four articulations arranged in two diametrically opposite articulation pairs, pair by pair in relation to the rotor axis, a first pair of articulations enabling the pivoting of the non-rotating plate on the non-rotating ring around a first diametral axis of the ring, and the second pair of articulations enabling the pivoting of the ring around a second diametral axis of the ring, which is perpendicular to the first diametral axis and remains perpendicular to the rotor axis, as well as the axial sliding of the ring respectively on and with the aid of two non-rotating guide columns around the rotor axis, parallel to the said rotor axis and in a same radial plane passing through this latter, and forming non-rotating connection parts retaining the non-rotating plate in relation to the gyroplane structure.

Figure 2:
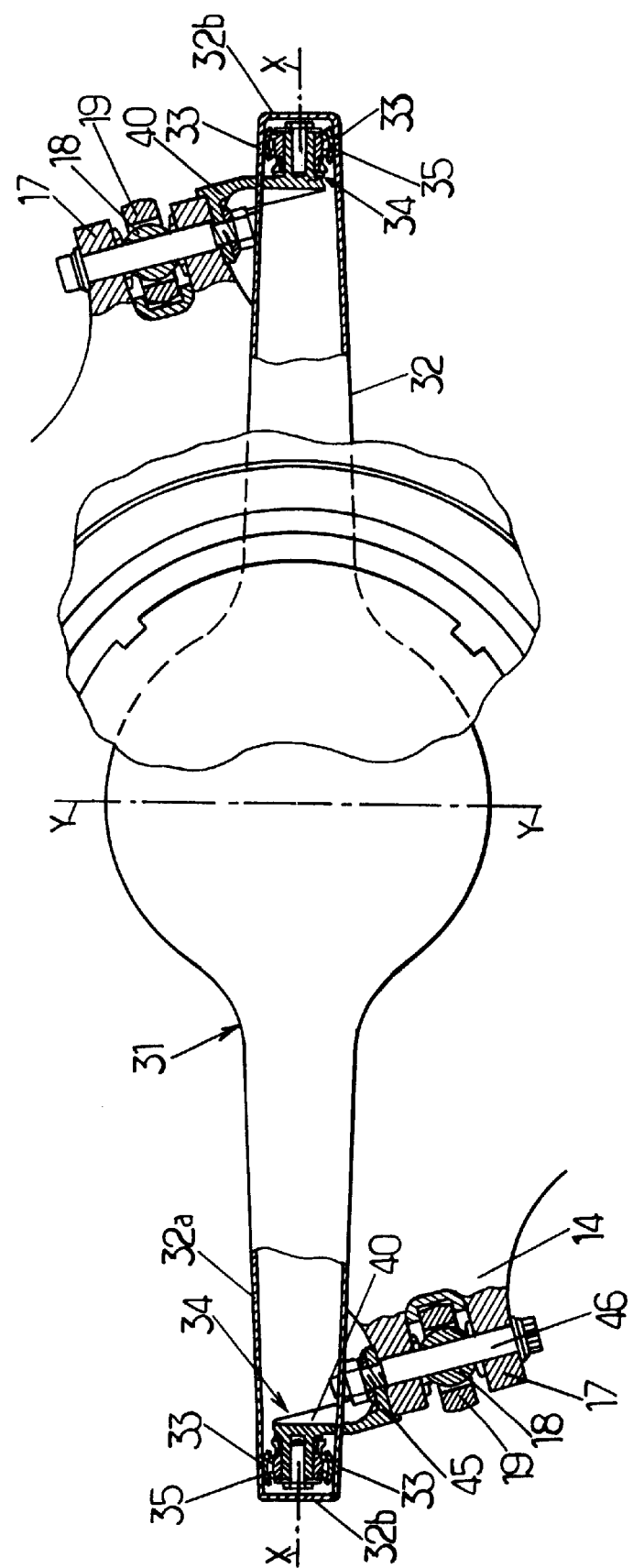
Figure 3:
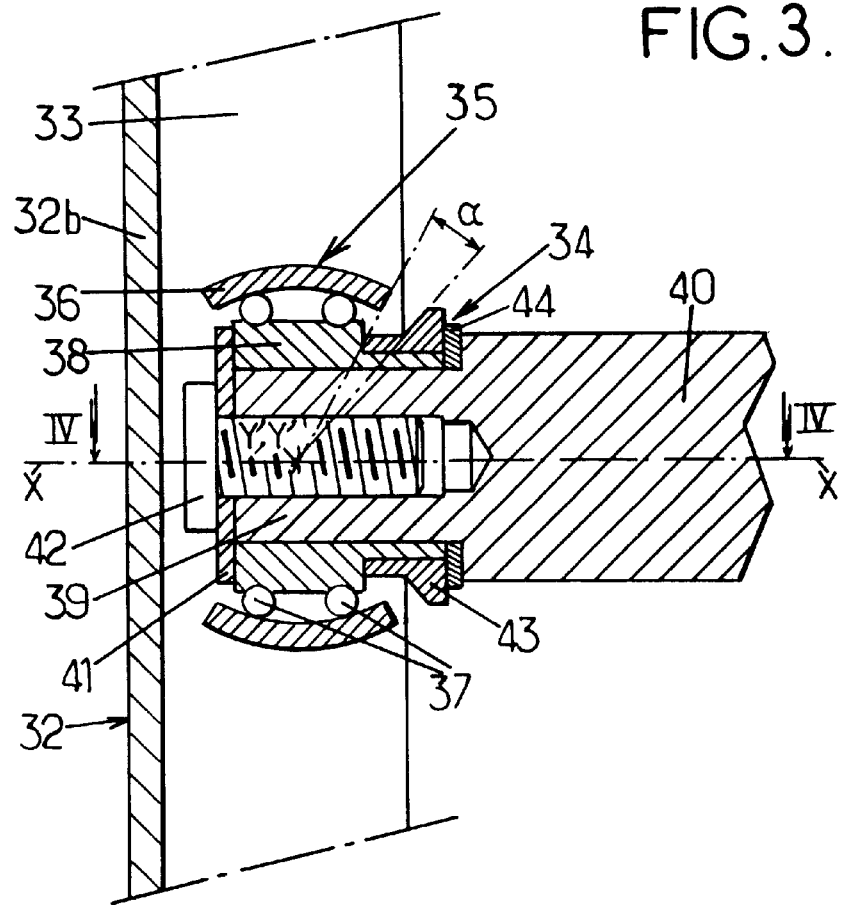
Figure 4:
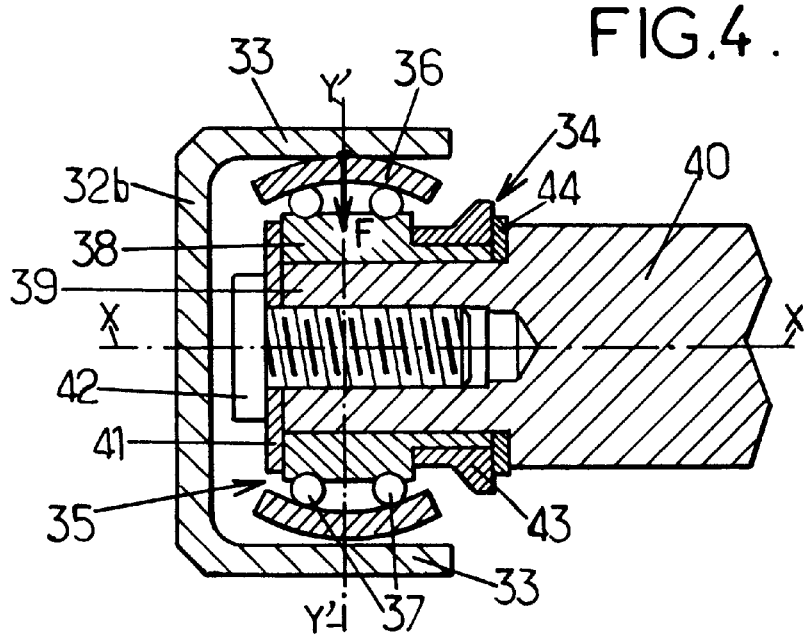
Figure 5:
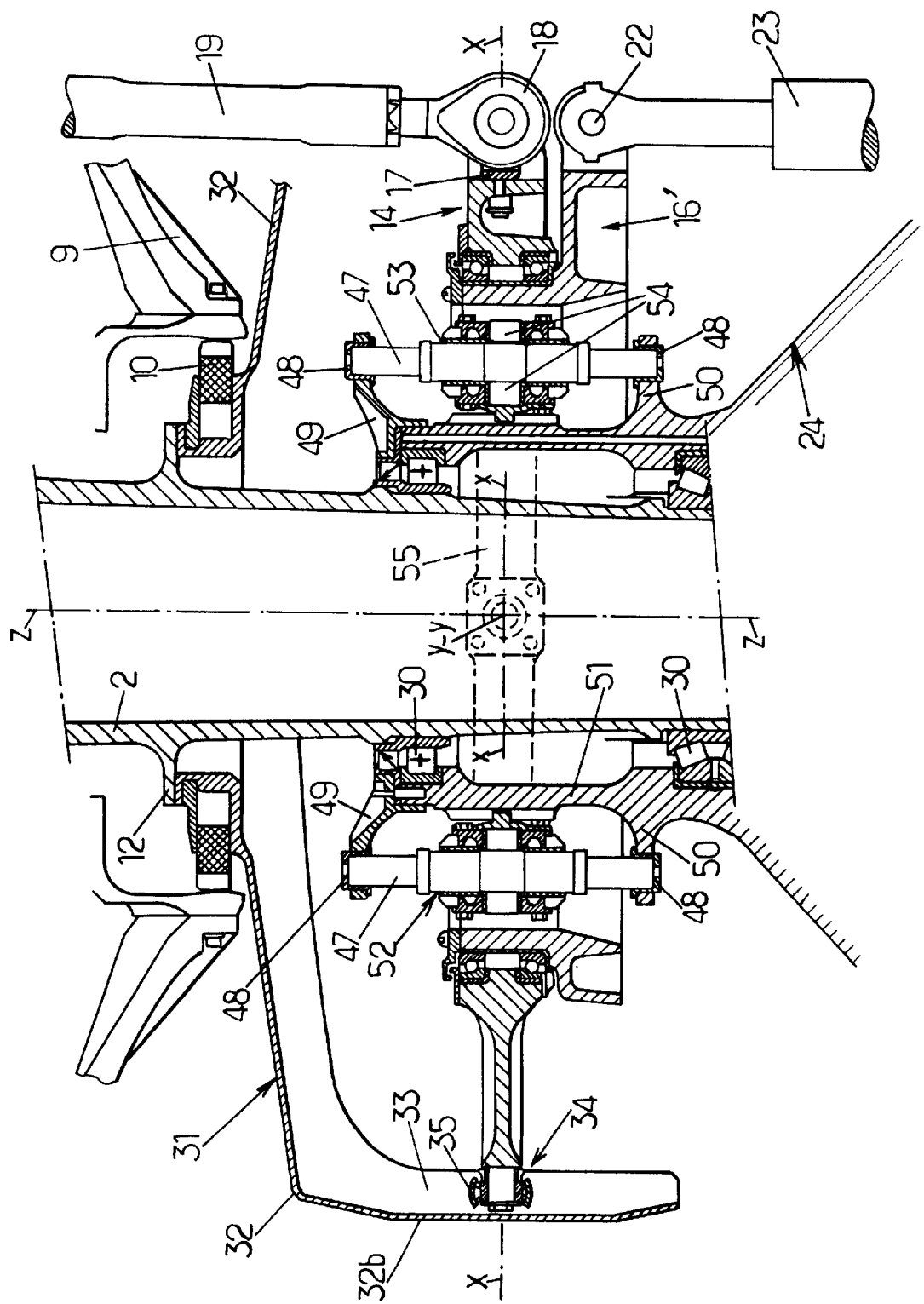
Figure 6:
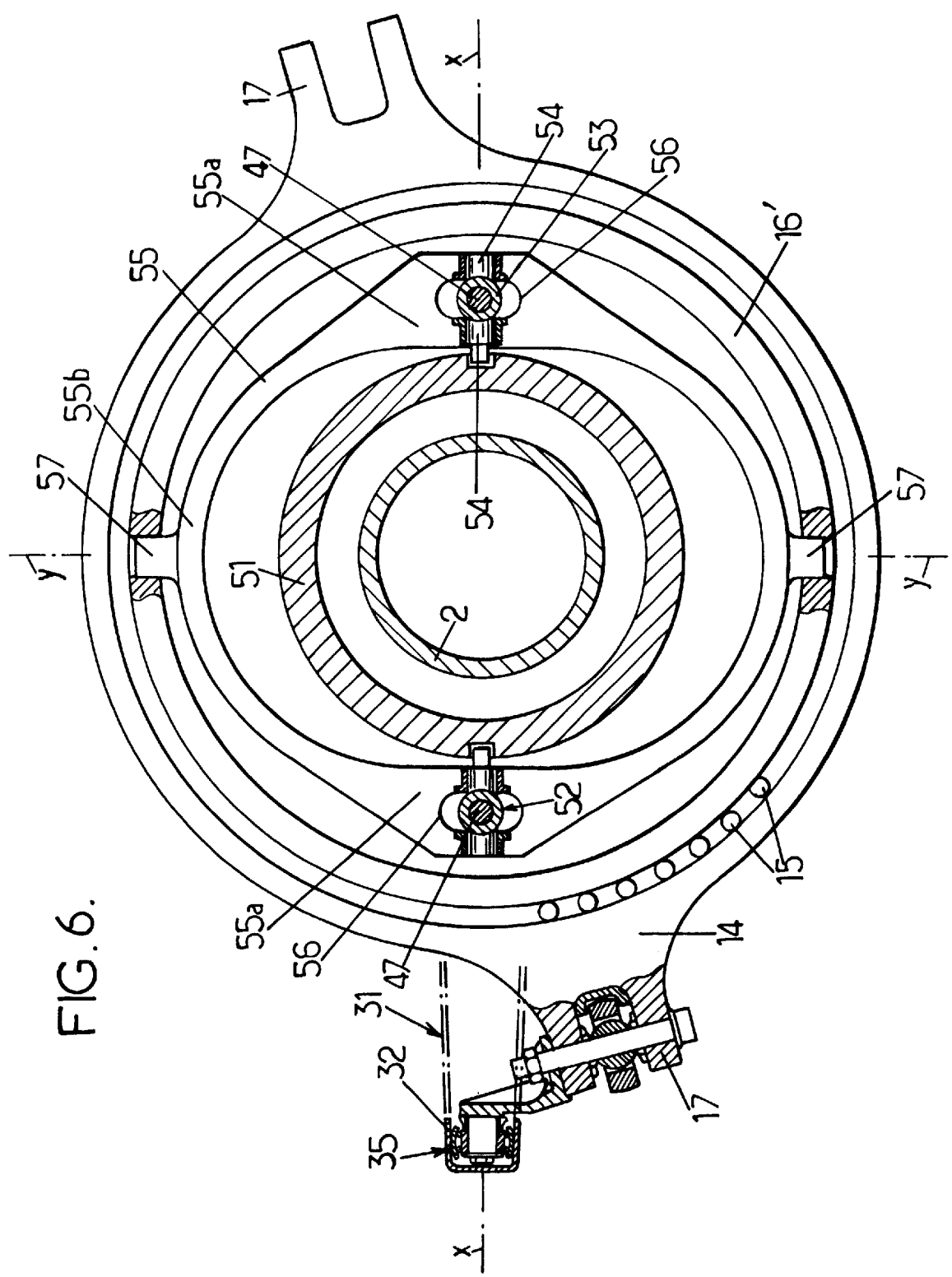

Other advantages and characteristics of the invention will emerge from the description given below, as a non-restrictive guide, of version examples described by reference to the appended drawings on which:

FIG. 1 is a diagrammatic and partial section view passing through the rotational axis of a helicopter main rotor fitted with an example of the pitch control system in accordance with the invention FIG. 2 is a partial view, part as a vertical elevation and part in section along II—II of FIG. 1, FIG. 3 is a larger scale view of a part of FIG. 1, showing a first example of the pitch control system driving finger of FIGS. 1 and 2, FIG. 4 is a section view along IV—IV of FIG. 3, FIG. 5 is a similar view to FIG. 1 of a rotor fitted with a second example of pitch control system in accordance with the invention, FIG. 6 is a partial transverse section view of the pitch control system of FIG. 5.

Figure 10:
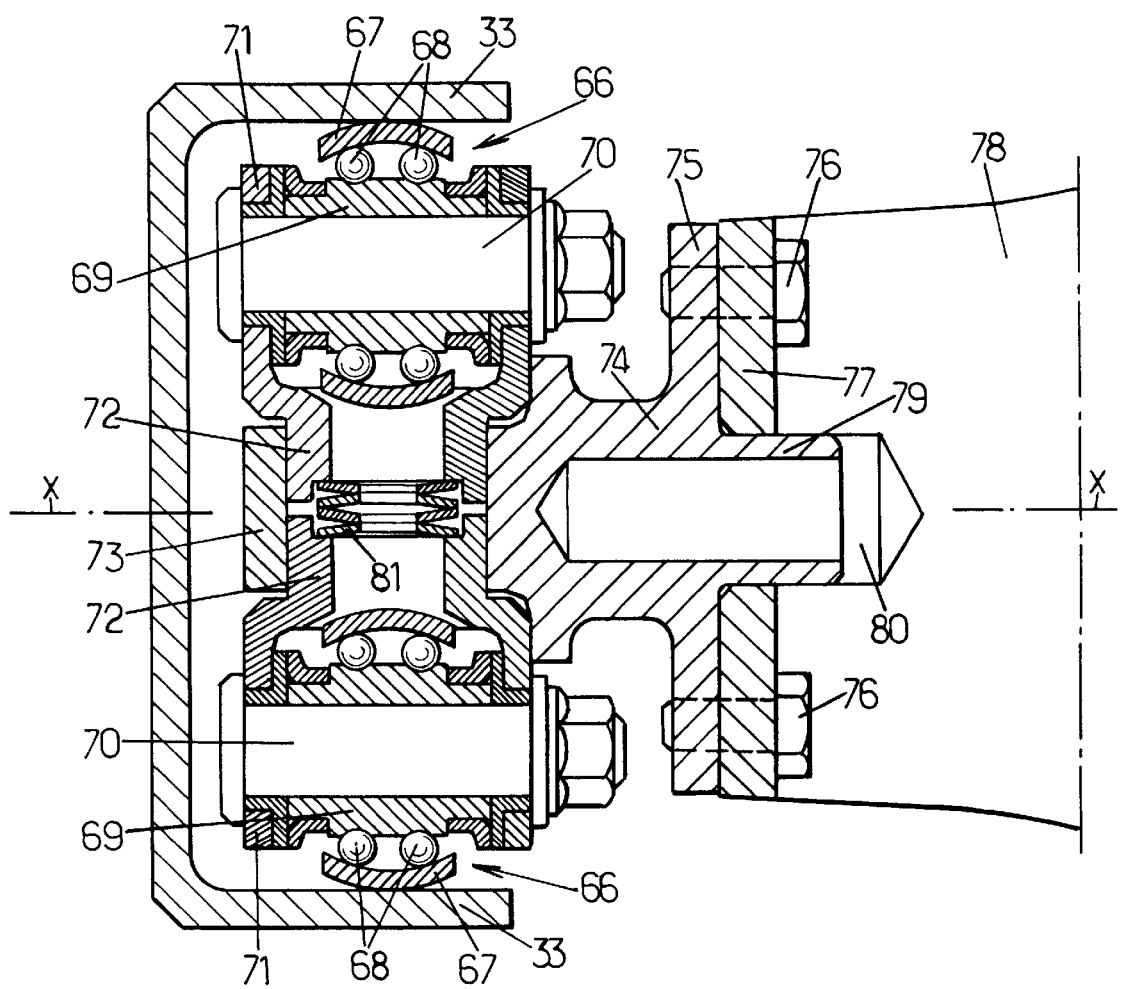
Figure 11:
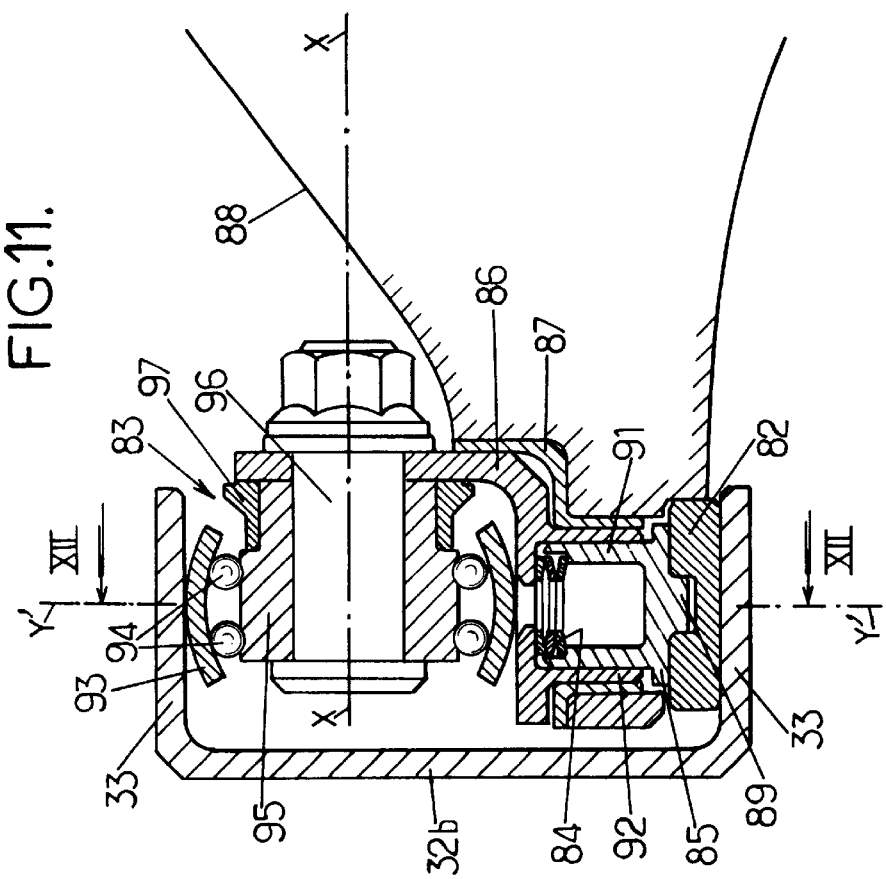
Figure 12:
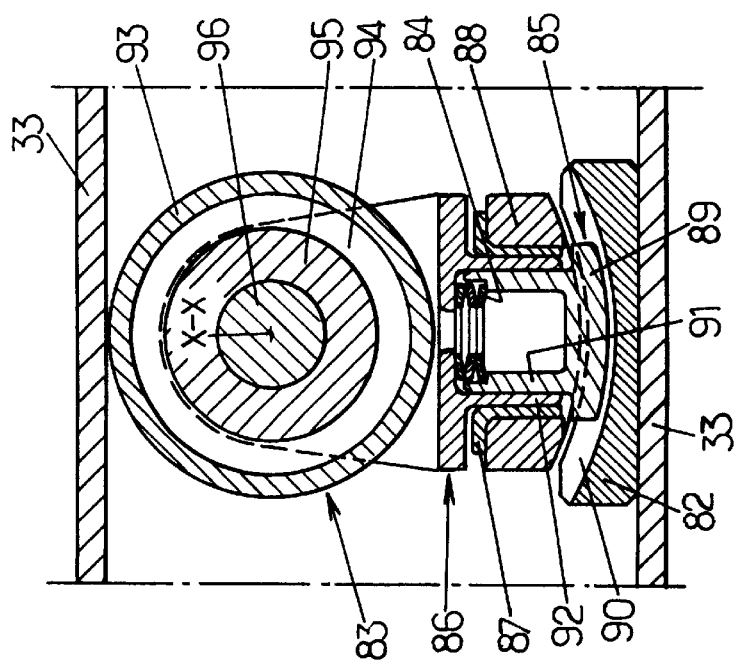

FIG. 7 is larger scale view of a part of FIG. 5, showing a second example of driving finger for the pitch control systems of FIGS. 1 and 5, FIG. 8 is a section along VIII—VIII of FIG. 7, FIG. 9 is a view along the arrow IX of FIG. 7, FIG. 10 is a partial section view similar to FIGS. 4 and 8 of a third driving finger example, FIG. 11 is a similar view to FIG. 10 of a fourth driving finger example, and FIG. 12 is a partial section view along XII—XII of FIG. 11.

On FIG. 1, the helicopter main rotor shows a known structure: it includes mainly a hub 1 integral with the upper end of a tubular rotor shaft 2, rotated by its base around its axis Z—Z, which is the rotor rotational axis. Each rotor blade 3 (only one of which is partly shown in FIG. 1) is held by its foot, and with the aid of two transverse pins such as 4, in an external radial clevis 5a of a connection part 5 of the blade 3 to the hub1. The part 5, called a sleeve in the following description, has an internal radial clevis 5b by which the sleeve 5 is connected to the hub 1 by retaining and articulation means 6, which retain the sleeve 5 and the blade 3 against the centrifugal forces, when the rotor rotates, and enable angular clearances of the sleeve 5 and the blade 3 in pitch, around a pitch change longitudinal axis A—A, substantially radial in relation to the rotor axis Z—Z, as well as in flapping and in drag, in the known manner.

In this example, the retaining and articulation means 6 include a spherical laminated stop of known structure, with a central laminated part 6a, constituted from an alternate stack of rigid dishes and elastomer layers in the shape of spherical segments centred substantially in the external radial edge 1a of a corresponding cavity 1b of the hub 1, which is of the radial cavitied type, comprising as many axial cavities 1b as the rotor has blades 3. On either side its central part 6a, the spherical laminated stop 6, housed in the corresponding cavity 1b, includes an internal radial frame 6b, strut mounted between the branches of the internal clevis 5b of the sleeve 5 by threaded bolts such as 7, and an external radial frame 6c fixed by a set of bolts and nuts such as 8 on the external radial edge of the corresponding cavity 1b. The spherical laminated stop 6 is thus connected to the hub 1 by its external frame 6c and to the sleeve 5 by its internal frame 6b.

For each blade 3, a bottom flap stop 9, fixed under the internal clevis 5b of the sleeve 5, engages a reciprocal ring 10, of known structure, mounted to slide radially around the shaft 2 in a guide crown 11 fixed, for example by bolting, to an external radial flange 12 of the shaft 2.

The shaft 2 is surrounded by a swash-plates assembly 13 of the pitch control system of the blades 3, the sleeve 5 of each of which is fitted, to this end, with a pitch lever 5c projecting laterally on the sleeve 5, for example from the side of the leading edge of the corresponding blade 3.

The swash-plates assembly 13 includes two annular plates, surrounding the rotor shaft 2, and one of which is a rotating plate 14 rotated with the aid of two ball bearings 15 around the central part 16a of the other plate 16 which is a non-rotating plate. External radial clevises 17, in equal number to the blades 3, are regularly distributed on the external periphery of the rotating plate 14, and in each clevis 17 a ball joint 18 is held on the rotating plate 14 for articulating the lower end of a control pitch rod 19, the upper end of which is articulated, also by a ball joint 20, in an end clevis of the pitch lever 5c of a corresponding blade 3. Under the rotating plate 14, the non-rotating plate 16 has three external radial clevises 21, one of which is for example directed toward the rear of the helicopter and each of the two others laterally toward respectively one of the two sides of the helicopter, and in each of which a ball joint 22 is held, on the non-rotating plate 16, for articulating the upper edge of respectively one of three control actuators 23, for example linear double acting servo-controlled jacks, the lower end of each of which is articulated, also by a ball joint (not shown) in a structure clevis of the helicopter, for example on the conical casing 24, which is fixed to the helicopter structure and surrounds the connection of the base of the rotor shaft 2 to the main gear box output, in order to rotate the shaft 2.

Under its central part 16a, the non-rotating plate 16 has also another clevis 25 for the articulation on this plate 16 of a non-rotating part, connecting the non-rotating plate 16 to the helicopter structure 24 to prevent rotation of the plate 16 around the axis Z—Z. For example, this non-rotating part can be a non-rotating compass 26 of conventional structure, with two arms articulated one on the other and in the clevis 25 of the non-rotating plate 16, and the other in a clevis 27 of the conical casing 24.

The two coaxial plates 14 and 16 can be translated axially, parallel to the rotor axis Z—Z, and inclined in every direction around this axis Z—Z by an axial translation and tipping guide mechanism of known structure, which holds the plates 14 and 16 centred on the rotor axis Z—Z. This guide mechanism includes a central ball joint 28, on which the non-rotating plate is mounted to oscillate by its central part 16a, the ball joint 28 being centred on the rotor axis Z—Z and mounted to slide axially (parallel to the axis Z—Z) around a cylindrical tubular guide 29, coaxial with the rotor axis Z—Z and non-rotating around this axis, because of being integral with the conical casing 24. In this axial guide 29, fixed in relation to the helicopter structure, the shaft 2 is guided in rotation by two bearings 30.

The control of the three actuators 23 enables translating the two plates 14 and 16 and the ball joint 28 along the axis Z—Z along the guide 29 and/or inclining the plates 14 and 16 on the ball joint 28, in every direction around the axis Z—Z, in order to transmit the changes respectively from the collective pitch and from the cyclic pitch to the blades 3 by means of the connecting rods 19.

Rotation of the rotating plate 14 with the rotor is ensured by a rotating plate driver 31. On FIGS. 1 and 2, the driver 31 includes two rigid arms 32, diametrically opposite in relation to the rotor axis Z—Z and fixed under the flange 12 of the rotor shaft 2 by a central driver part constituting, in this example, the lower annular part of the support crown 11 of the reciprocal ring 10. The driver 31 is thus fixed to rotate with the shaft 2, above the swash-plates assembly 13. Each arm 32 includes a part 32a substantially radial in relation to the axis Z—Z and extended by an axial part 32b parallel to the axis Z—Z on the major part of its axial length, and slightly curved toward the axis Z—Z at its lower end and its upper end connecting it to the radial part 32a. The axial arm part 32b has a transverse "U" section delimiting a groove open radially toward the rotor axis Z—Z. The internal faces of the two webs 33 of the "U" groove in each axial arm part 32b thus form a rigid rotational driving track for respectively one of two driving fingers 34 integral with the rotating plate 14 and diametrically opposite on this latter, each finger 34 projecting radially outwards from the rotating plate 14 and engaging between the two webs 33 of the "U" groove of respectively one of the arm axial parts 32b.

In this first example, each finger 34 includes respectively one of two coaxial rollers 35 each rolling in respectively one of the "U" grooves, against at least one of the webs 33 of the "U" groove delimiting the corresponding driving track, and around the common axis of the rollers 35, which is a diametral axis of the rotating plate 14 and marked X—X on FIGS. 1 and 2. The two rollers 35 articulated on the rotating plate 14 being diametrically opposite on this latter, the swash-plates assembly 13 can therefore be inclined simultaneously around the diametral axis X—X, common with the axis of rotation of the rollers 35, and around a second diametral axis Y—Y of the plates 14 and 16, which is perpendicular to the axis X—X and to the rotor axis Z—Z, at their intersection, that is to say at the centre of the ball joint 28 and the plates 14 and 16, like a universal joint.

In operation, the trajectory and the performance of the rollers 35 are as follows: for the cyclic pitch, the two rollers 35 roll in the "U" grooves of the axial parts of the arms 32b of the driver 31 along a portion of an alternate circular trajectory (sinusoidal movement) around the axis Y—Y. In the case of change of the collective pitch, the two rollers 35 roll in the "U" grooves between the webs 33 along a rectilinear trajectory, parallel to the rotor axis Z—Z, upwards (toward the hub 1) or downward (toward the structure and conical casing 24) following the desired collective pitch. In the case of combined cyclic pitch and collective pitch, the two rollers 35 are forced into pivoting around an axis Y'—Y' (see FIGS. 3 and 4), which is parallel to the axis Y—Y and passes through the centre of the roller 35. This pivoting angle is a maximum at the upper and lower ends of the trajectory of the rollers 35 between respectively the maximum collective pitch and the maximum positive cyclic pitch, on the one hand, and, on the other hand, the minimum collective pitch and the negative maximum cyclic pitch.

In order to remove all risk of sliding during the change of collective pitch (trajectory parallel to the rotor axis Z—Z), each roller 35 is preferably a ball joint roller as shown to a larger scale in FIGS. 3 and 4.

FIGS. 3 and 4 show in detail the structure and the mounting of a ball joint roller, the use of which is proposed only for the rotation around the axis Z—Z of a finger 34 by the same web 33 of the "U" groove in which the finger 34 is engaged, the contact force F (see FIG. 4) being therefore always on the same web 33. The roller 35 of FIGS. 3 and 4 includes a ball joint 36, centred on the intersection of the axes X—X and Y'—Y' mentioned above, and rotary mounted around the diametral axis X—X of the rotating plate 14 and pivoting around the axis Y'—Y' by two ball bearings 37 offset along the axis X—X on an annular hub 38 fastening the roller 35 on the external radial and cylindrical end 39 of a finger carrier arm 40 integral with the rotating plate 14. The hub 38 is held on the arm 40 by support of its axial end turned toward the arm 40, and with reduced external diameter, against a shoulder connecting the end part 39 to the arm 40, and by support of a washer 41 against the other axial end of the hub 38, the washer 41 being held by the head of a bolt 42 with shank screwed into the end part 39 of the finger carrier arm 40. In addition, in order to limit the pivoting angle of the ball joint 36 around the axis Y'—Y' and reduce friction, a ring 43 is mounted to rotate around the diametral axis X—X on the axial end of reduced external diameter of the annular hub 38. On FIG. 3, the maximum pivoting angle of the ball joint 36 at the two end points of the trajectory of the roller 35 on the web 33 forming the guide track on which the roller 35 rolls has been designated by α, while a small play, of the order of about 0.3 mm, remains between the ball joint 36 of this roller 35 and the other web 33 of the "U" groove, as can be seen in FIG. 4. This angle α is limited, on the rotating ring 43 coaxial with the roller 35, by a frustoconical top contact face the apex of which is located at the intersection of the axes X—X and Y'—Y'. An anti-friction ring 44 is preferably interposed between the shoulder on the finger carrier 40, from one side, and, from the other side, the rotating ring 43 and the hub 38.

During the changes of pitch of the blades 3 and sleeves 5, in order to avoid all interference between the pitch rods 19 and the driver 31, and in particular between each of the two arms 32 and the pitch rod 19 which is nearest, in the circumferential direction, each of these two arms 32, the finger carrier arm 40, which can be a radial arm integral with the rotating plate 14, is preferably an angled arm, as shown in FIG. 2, and laterally projecting on one side of the clevis 17 of the rotating plate 14 in which is articulated the pitch rod 19 nearest the considered driver arm 32.

To this end, the angled finger carrier arm 40 has a lug 45 fixed against the external lateral face of one of the two branches of the clevis 17 by the screw-nut assembly 46 forming simultaneously a retaining spindle for the ball joint 18 of the lower end of the pitch rod 19 in this clevis 17 of the rotating plate 14.

FIG. 5 partially shows a rotor of the same general structure as that of FIGS. 1 and 2, and the elements of which are marked by the same reference numbers, but fitted with a different pitch control system in so far as where the swash-plates assembly 13 is no longer guided in axial translation and tipping by a central ball joint mechanism sliding axially around a guide, but by a mechanism with two axial fixed guide columns and with a universal joint with a non-rotating intermediate ring pivoting, on the one hand, in relation to the columns around a first diametral axis of the ring, and, on the other hand, on the non-rotating plate, around a second diametral axis of the ring, perpendicular to the first.

More precisely, two cylindrical columns 47, parallel to one another and to the rotor axis Z—Z and symmetrical one to the other in relation to the axis Z—Z in a same radial plane passing through this axis Z—Z, are fixed to the helicopter structure, being held by their upper and lower ends in the dishes 38 mounted in the upper 49 and lower 50 fixing lugs of a tubular support 51, coaxial with the shaft 2 guided in rotation in the support 51 by the bearings 30 positioned and held by the support 51, which is fixed to the upper end of the conical casing 24. The upper fixing lugs 49 are brought back by screwing onto the support 51 in order to facilitate the mounting of the columns 47 and the mounting and the holding in the support 51 of the upper bearing 30 and an associated sealing joint, whereas the lower fixing tabs 50 are radial and are integral with the support 51.

On each column 47 is mounted axially sliding a runner 52 in the shape of a crosspiece. Each runner 52 comprises a tubular part 53, by which the runner slides around the column 47, as well as two cylindrical, coaxial pins 54, projecting radially outwards from the tubular part 53 in relation to its axis and diametrically opposite on this tubular part 53.

As is also shown in FIG. 6, a universal joint ring 55 is mounted around the support 51 and between this support 51 and the non-rotating plate 16' of the swash-plates assembly 13, the rotating plate 14 of which is identical to that of the example of FIGS. 1 and 2 and connected in the same way to the pitch levers of the blades by the pitch rods 19. The ring 55 has two diametrically opposite parts 55a which are radially widened, and preferably axially narrowed, and in each of these widened parts 55a, the ring 55 is passed through by an axial opening 56 of oblong shape. In each of the openings 56 of the ring 55 emerge two cylindrical coaxial and radial bores, arranged one toward the inside and the other toward the outside of the ring, in order to receive the two pins 54 of a runner 52 passing through the corresponding opening 56, and the four radial bores thus arranged in the ring 55 are coaxial around a same diametral axis x—x of the ring 55. A sufficient play is provided in the circumferential direction between each opening 56 and the runner 52 which passes through it in order to enable pivoting of the ring 55 around its diametral axis x—x which is the axis of the pins 54 of the two runners 52, in order to prevent all interference between the ring 55 and the runners 52 during the changes of cyclic pitch, during which the four pins 54 of the two runners 52 rotate in the four radial bores emerging in the two openings 56 of the ring 55.

Between its widened parts 55a, the ring 55 has two diametrically opposite parts 55b, which are radially narrowed but preferably axially over-thickened, and each of which has respectively one of two cylindrical pins 57, projecting radially outwards from the ring 55 and coaxial around a same diametral axis y—y of the ring 55, perpendicular to the other diametral pivoting axis x—x of the pins 54. The two diametrically opposite pins 57 of the ring 55 are each engaged respectively in one of two cylindrical radial and coaxial bores arranged, for rotatably receiving the pins, in the non-rotating plate 16'. In that way, the non-rotating plate 16', and therefore also the rotating plate 14 which it supports, can pivot relative to the ring 55 around the diametral axis y—y on the pins 57, and, at the same time, the ring 55 can pivot around the other diametral axis x—x on the pins 54 of the runners 52, which can simultaneously slide axially along the fixed columns 47.

In this version, the ring 55 is a non-rotating ring held in rotation around the axis Z—Z by the runners 52 and the fixed columns 47, with the result that the non-rotating plate 16' is also held in rotation by the ring 55 and the aforementioned parts which keep this latter in rotation around the axis Z—Z. The two pins 57 and the four pins 54 define four articulations arranged in two diametrically opposite articulation pairs pair by pair in relation to the axis Z—Z, a first articulation pair, defined by the two pins 57, enabling the pivoting of the non-rotating plate 16' on the ring 55 around the diametral axis y—y of the ring 55, and the second articulation pair, defined by the four pins 54, enabling the pivoting of the ring 55 around the other diametral axis x—x, which is perpendicular to the diametral axis y—y and remains perpendicular to the rotor axis Z—Z, the axial sliding movements of the ring 55, and therefore of the rotating 14 and non-rotating 15 plates pivoted on it, being allowed by the runners 52 along the fixed guide columns 47.

For the remainder, the pitch control system is identical to that of FIGS. 1 to 4 in the version of the driver 31 of the rotating plate 14, with the two rigid arms 32 the axial parts of which 32b define the "U" grooves in which are engaged diametrically opposite driving fingers 34 on the rotating plate 14, and which include ball joint rollers 35 as previously described by reference to FIGS. 3 and 4.

FIGS. 7 to 9 show a second example of driving finger, usable in place of the finger 34 with roller 35 of the preceding figures in the case where the rotation of a finger is effected with a contact force F applying alternately on one or other of the two webs 33 (see FIG. 8) of the "U" groove.

In this second example, each finger includes respectively one of two runners 58 sliding alternately against one or other of the two webs 33 of the axial part 32b of the corresponding rigid arm 32 of the driver 31, identical to that of the preceding examples. In order to facilitate the transfer of the load between the webs 33 and the runner 58, reducing the friction, the internal face of the webs 33 can have a carbide coating on its zone corresponding to the trajectory of the runner 58, the zones of the external faces of which, coming into contact with the webs 33, can also have carbide coatings. Each runner 58 has the general external shape of a relatively flat rectangular parallelepiped, drilled with a central cylindrical opening of circular section. Through this opening, each runner 58 can be articulated relative to the rotating plate 14, to which the runner 58 is connected by a finger carrier arm 59 radial in relation to the centre of the rotating plate 14 and integral with this latter, for example in aluminium, whereas the driver 31 and its arms 32 are for example in steel. Each runner 58 has thus two opposite lateral faces 60 which are plane and parallel to each other as well as to the webs 33 of the "U" groove in which the runner 58 slides, and through its central opening each runner 58 is rotary and sliding mounted around a hub 61 fastening the runner 58 on the external radial end of the finger carrier arm 59. To this end, anti-friction shouldered rings 62 are mounted in the central opening of the runner 58, and around an anti-friction ring 63 housed in the bottom of a "U" groove delimited by an annular rim 64 at the periphery of the hub 61, which is centred by its rim 64 around the external cylindrical radial end of the finger carrier arm 59 and held against this end by the head of a bolt 65 with shank passing through the central part of the hub 61 and screwed in this end of the arm 59.

In FIG. 7 the runner 58 covers, by sliding on one or other of the webs 33, the same trajectories as the roller 35 of the preceding examples, during changes of the collective and cyclic pitches.

In this example, the substantially radial part 32a of each driver arm 32 can have a "U" structure open downward, that is to say toward the swash-plates assembly 13, as in the example of FIGS. 1 to 4 or again, as evident in FIG. 7, a cased structure indicated by 32'a in FIG. 7, in order to give more rigidity.

FIG. 10 shows a third example of driving finger, being able to replace those of the preceding figures and engaging with a driver arm 32 of the same structure as in the preceding examples. The driving finger of FIG. 10 is, as that of FIGS. 7 to 9, usable for rotating with contact forces exerted alternately on one or other of the two webs 33 of the corresponding "U" groove. This driving finger includes two double rollers 66, mounted symmetrically either side the radial axis X—X of the rotating plate, which corresponds to the radial axis X—X of FIGS. 1 to 5 and 7 and 8, and each of which are continuously pushed back into rolling contact against a respective web 33 by elastic return means. More precisely, each of the double rollers 66 is a ball joint roller 67, similar to the ball joint 36 of the example of FIGS. 3 and 4, and rotated by two ball bearings 68 on a tubular hub 69 around a spindle 70, parallel to the diametral axis X—X and constituted by a bolt-nut assembly for retaining the hub 69, with the assistance of shouldered rings, between the two branches of a clevis 71 respectively of one of two supports 72 mounted to slide, in a direction perpendicular to the axis X—X and to the webs 33, in a tubular part 73 of a mounting 74 provided with a flange 75 fixed by bolts 76 on the external radial end 77 of a radial finger carrier arm 78 integral with the rotating plate. The mounting 74 is centred on the diametral axis X—X by a cylindrical centralising connector 79 engaged in an end cylindrical bore 80, coaxial around the axis X—X in the end of the finger carrier arm 78. The elastic return means are a pile of Belleville washers 81 placed between the facing ends of the two supports 72 in the tubular part 73 of the frame 74. Thus, the Belleville washers 81 separate from each other the supports 72 sliding in the tubular part 73 and hold each of the ball joints 67 of the double rollers 66 in contact against respectively one of the two webs 33.

FIGS. 11 and 12 show a fourth example of driving finger, being able to be used as those of FIGS. 7 to 10 in the case of the rotation of a finger by a "U" groove of a driving arm with contact forces alternately on one or other of the two webs 33 of this arm 32. In this example, each finger includes a runner 82 and a roller 83 which are continuously held in respectively sliding and rolling contact against respectively one of the two webs 33 of the "U" groove in the axial part 32b of the corresponding rigid arm 32, similar to that of the preceding examples. The holding of these respectively sliding and rolling contacts is ensured by elastic return means, constituted, as in the example of FIG. 10, by a pile of Belleville washers 84 mounted between two supports 85 and 86 sliding coaxially relative to each other in a shouldered socket 87 mounted in a transverse bore at the external radial end of a finger carrier arm 88 integral with the rotating plate. The runner 82 is held applied from one side by a plane face against the corresponding web 33 and from the other side by a cylindrical face, centred on the rotation axis X—X of the roller 83, against the support 86, on which the runner 82 is guided and centred by a cotter 89 in the shape of a circular arc centred on the axis X—X and projecting on the support 85 toward the corresponding web 33, and engaged in a central groove 90, also a circular arc centred on the axis X—X, arranged in the runner 82 (see FIG. 12). From the side opposite the runner 82, the support 85 comprises a cylindrical tubular part 91, in contact with the Belleville washers (84) and sliding mounted in a cylindrical tubular part 92 by which the support 86 of the roller 83 is itself sliding mounted in the socket 87. The two supports 85 and 86, and therefore the runner 82 and the roller 83, are separated from each other in a direction perpendicular to the diametral axis X—X of the rotating plate, which corresponds to an axis of rotation of the swash-plates assembly, and around which the roller 83 rotates. In this example, this roller 83 has the same structure and is mounted substantially in the same way as the roller 35 of FIGS. 3 and 4, insofar as where it is a question of a roller 83 with ball joint 93 rotating around the axis X—X and pivoting around a perpendicular axis Y'—Y' passing through the centre of the ball joint 93, by means of two bearings 94 and around a tubular hub 95 held by a bolt-nut assembly 96 on the support 86, a rotating ring 97, corresponding to the ring 43 of the example of FIGS. 3 and 4, being mounted to rotate around the axis X—X on a reduced diameter part of the tubular hub 95 in order to limit pivoting of the ball joint 93 and friction.

The pitch control systems of the invention described above, enable making main rotor mast-hub assemblies of least vertical or axial size in relation to known versions with rotating compasses driving the rotating plate of the swash-plates assembly of the pitch control system.

In addition, the means of driving the rotating plate such as described above include less parts and are less heavy and less expensive to manufacture, to install and to maintain than rotating compass versions.

What is claimed is:

1. A pitch control system of blades of a gyroplane rotor on which each blade is, firstly, rotated around an axis of rotation of a rotor shaft by means of a hub fixed to rotate with the shaft, and, secondly, fixed in rotation, around a longitudinal pitch change axis of the blade, with at least a pitch lever controlled by a corresponding pitch rod, connected to a rotating plate rotating with the rotor and belonging to a swash-plates assembly in which the rotating plate is mounted to rotate on a non-rotating plate, held by at least a non-rotating connecting part connecting the non-rotating plate to a structure of the gyroplane, the two plates being annular, surrounding the rotor axis, and being able to be translated parallel to the rotor axis and inclined in every direction around the rotor axis, under the action of control actuators connecting the non-rotating plate to the structure, in order to control respectively the collective pitch and the cyclic pitch of the blades, wherein the rotating plate is fixed to rotate with the rotor by a rotating plate driver, including two rigid rotation driving tracks, extending at least in part substantially axially, parallel to the rotor axis, diametrically opposite in relation to the rotor axis and fixed in rotation with one at least of two parts which are the hub and the rotor shaft, each track engaging with respectively one of two opposite on this rotating plate, one of the two engaging elements which are a track and a finger having two webs between which the other element is engaged, with the result that each driving finger follows on the corresponding track a rectilinear trajectory, parallel to the rotor axis, in the case of change of the collective pitch, and a circular arc trajectory centered on the rotor axis in the case of cyclic pitch change.

2. A system in accordance with claim 1, wherein each driving track is delimited in a substantially axial groove in the driver, and the corresponding finger is engaged in the groove.

3. A system in accordance with claim 2, wherein each groove is formed in a substantially axial part having a "U" transverse section of respectively one of two rigid arms of the driver, and the corresponding finger is engaged between two webs of the "U" groove of the arm.

4. A system in accordance with claim 3, wherein said "U" groove is open radially toward the rotor axis, and each finger projects outwards from the rotating plate, radially in relation to a center of the rotating plate.

5. A system in accordance with claim 3, wherein each arm of the driver comprises a substantially radial arm part relative to the rotor axis, and connecting said substantially axial arm part to a central part for connection to a fixing flange on the rotor shaft, from the side turned toward the hub in relation to the swash-plates.

6. A system in accordance with claim 3, wherein at least one finger includes at least a runner and/or at least a roller respectively sliding and/or rolling against one at least of the two webs of the "U" groove delimiting the corresponding driving track.

7. A system in accordance with claim 6, wherein said runner and said corresponding driving track comprise carbide coatings at least in their mutual contact zones.

8. A system in accordance with claim 6, wherein said runner is articulated relative to the rotating plate.

9. A system in accordance with claim 8, wherein said runner has two opposite lateral faces substantially plane and parallel to the webs of the "U" groove in which the runner slides, and the runner is rotary and sliding mounted around a fastening hub of the runner, said hub being fixed on an external radial end of a finger carrier arm of the rotating plate.

10. A system in accordance with claim 6, wherein each finger comprises respectively one of two coaxial rollers, mounted diametrically opposite on the rotating plate and rolling around a common axis.

11. A system in accordance with claim 10, wherein at least one roller is a ball joint roller rotary mounted, around a substantially radial axis on the rotating plate, and pivoting around any axis perpendicular to said substantially radial axis, on a hub fastening said roller, said hub being fixed on an external radial end of a finger carrier arm of the rotating plate.

12. A system in accordance with claim 11, wherein the pivoting of the ball joint of said roller around an axis perpendicular to said substantially radial axis is limited by a rotating ring, rotary mounted around said substantially radial axis on the hub fastening the roller.

13. A system in accordance with claim 6, wherein one at least of the fingers comprises two double rollers, each rotation mounted around respectively one of two spindles substantially parallel to a same substantially radial axis of the rotating plate, and each held by elastic return means in rolling contact against respectively one of the two webs of the corresponding "U" groove.

14. A system in accordance with claim 13, wherein each of the double rollers is rotary mounted, by at least one bearing, on respectively one of two supports movably mounted, substantially perpendicular to said substantially radial axis, and separated from each other by elastic return means, at an external radial end of a finger carrier arm of the rotating plate.

15. A system in accordance with claim 14, wherein the finger carrier arm is added to project laterally on a side of a clevis of the rotating plate in which a pitch rod is articulated.

16. A system in accordance with claim 6, wherein one at least of the fingers comprises a roller and a runner, the roller being mounted to rotate around a substantially radial axis of the rotating plate, and the roller and the runner being held by elastic return means in respectively rolling and sliding contact against respectively one of two webs of the corresponding "U" groove.

17. A system in accordance with claim 16, wherein the runner and the roller are respectively supported and rotary mounted on respectively one of two movable supports, substantially perpendicular to said substantially radial axis, and separated from each other by said elastic return means at an external radial end of a finger carrier arm of the rotating plate.

18. A system in accordance with claim 1, wherein the swash-plates are able to be translated and inclined by an axial translation and tipping guide mechanism including a central ball joint, centred on the rotor axis and on which ball joint the swash-plates are oscillating mounted, said ball joint being sliding mounted parallel to the rotor axis around a cylindrical guide coaxial with the rotor axis and non-rotating around said rotor axis.

19. A system in accordance with claim 1, wherein the swash-plates are translated and inclined by an axial translation and tipping guide mechanism which includes a universal joint connection, with a non-rotating ring around the rotor axis, and four articulations arranged in diametrically opposite articulation pairs pair by pair in relation to the rotor axis, a first articulation pair enabling the pivoting of the non-rotating plate on the non-rotation ring around a first diametral axis of the ring, and the second articulation pair enabling the pivoting of the ring around a second diametral axis of the ring, which is perpendicular to the rotor axis, as well as the axial sliding of the ring respectively on and with the aid of two guide columns non-rotating around the rotor axis, parallel to said rotor axis and in a same radial plane passing through said rotor axis this latter, and forming non-rotating connection parts holding the non-rotating plate in relation to the gyroplane structure.

20. A system in accordance with claim 19, wherein the first articulation pair includes at least two first pins coaxial around the first diametral axis of the ring and diametrically opposite in relation to the centre of the ring, and projecting onto one of two parts which are the non-rotating plate and the ring and each mounted to rotate respectively in one of two coaxial and diametrically opposite bores on the other of said parts, and the second articulation pair includes two slides, each of which is mounted to slide axially along respectively one of the two non-rotating columns, which are fixed relative to the gyroplane structure, and on which slides said ring is mounted to pivot around said second diametral axis by at least two second radial pins diametrically opposite in relation to the centre of the ring, and coaxial around said second diametral axis.

21. A system in accordance with claim 20, wherein each slide comprises at least one tubular part by which the slide is sliding mounted around the corresponding column, and each slide carries at least a second pin projecting radially in relation to the axis of said column and revolving mounted in a radial bore of the ring.

22. A system in accordance with claim 21, wherein each slide has the form of a crosspiece with a tubular part sliding around a guide column, and two second pins projecting radially outwards from the tubular part and directly opposite in relation to the axis of said tubular part, said second pins revolving in radial bores of the ring, respectively on either side of one of two openings arranged in the ring for the passage of the crosspieces and guide columns.

* * * * *